United States Patent [19]

Bryan

[11] 4,432,587
[45] Feb. 21, 1984

[54] RECIRCULATING BALL BEARING ASSEMBLY

[75] Inventor: Frank T. Bryan, Greece, N.Y.

[73] Assignee: Blasius Industries, Inc., Clifton, N.J.

[21] Appl. No.: 85,993

[22] Filed: Oct. 18, 1979

Related U.S. Application Data

[63] Continuation of Ser. No. 918,070, Jun. 22, 1978, abandoned.

[51] Int. Cl.³ ............................................. F16C 29/06
[52] U.S. Cl. .................................................. 308/6 C
[58] Field of Search ........................ 308/6 R, 6 B, 6 C

[56] References Cited

U.S. PATENT DOCUMENTS

3,655,247  4/1972  Grover ............................... 308/6 C
3,845,993  11/1974  Schiler ............................... 308/6 C

FOREIGN PATENT DOCUMENTS

696448  9/1953  United Kingdom ............... 308/6 C
1302026  1/1973  United Kingdom ............... 308/6 C Primary Examiner—Richard R. Stearns
Attorney, Agent, or Firm—Cumpston & Shaw

[57] ABSTRACT

A recirculating ball bearing assembly mountable between two objects to facilitate movement therebetween. The ball bearing assembly comprises a body portion having one or more recessed sides, and an elongated opening in the body portion extending through the sides. An elongated inner race plate having arcuate ends extends through the opening with at least one side portion of the plate extending into a complementary recess to form an endless inner surface of a ball bearing track. The smooth uninterrupted outer surface of each recess has a straight portion and integral arcuate end portions forming a major portion of the outer surface of the endless ball bearing track. The recesses and outer surface terminate at a flat surface of the body portion, which faces and is spaced from a bearing surface of one of the objects. The bearing surface forms a minor portion of the outer surface of the endless ball bearing track. A cover plate is provided over the recessed side or sides of the body portion for holding the ball bearings in the endless ball bearing track or tracks.

2 Claims, 4 Drawing Figures

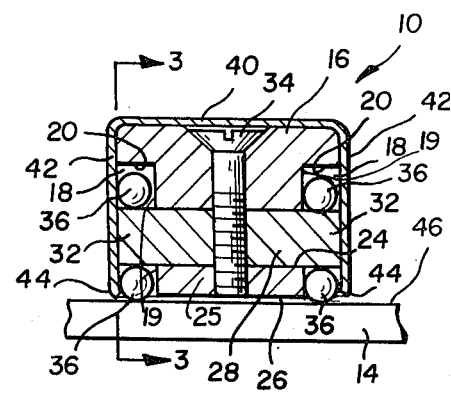
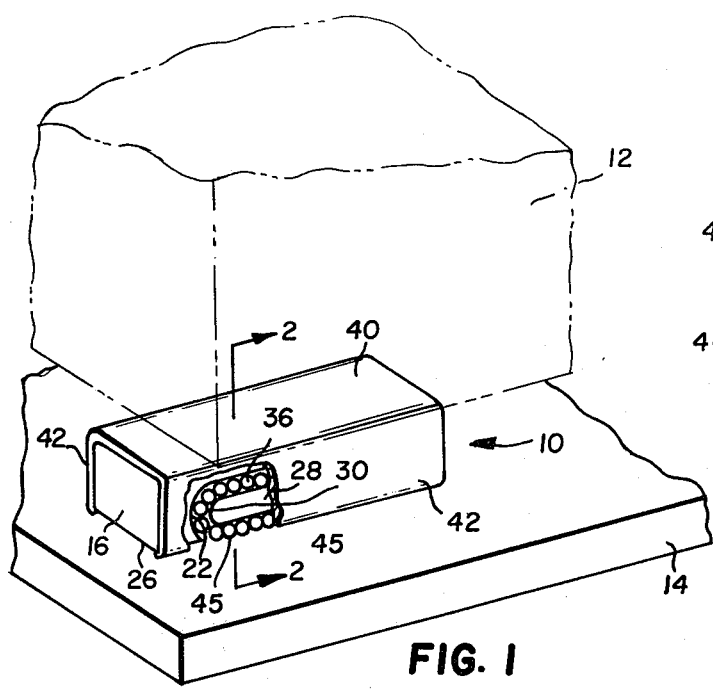
FIG. 1
FIG. 2
FIG. 3
FIG. 4

RECIRCULATING BALL BEARING ASSEMBLY

This is a continuation, of application Ser. No. 918,070, now abandoned filed June 22, 1978.

BACKGROUND OF THE INVENTION

1. Field of the Invention

This invention relates generally to bearings, and more specifically to a recirculating ball bearing assembly.

2. Description of the Prior Art

Recirculating ball bearing assemblies are generally well known in the art of which U.S. Pat. Nos. 3,845,993, 3,655,247, 1,750,140 and 1,883,103 are exemplary. U.S. Pat. No. 3,845,993 discloses a recirculating ball bearing assembly comprising a base plate having recessed side surface areas and partial opposed bearing track surfaces on each side surface. The bearing assembly further has a body portion having recessed sides and partial opposed tracks. A guide member with arcuate ends is interposed between the base plate and body portion. Screws secure the base plate, body portion and guide member together so that the partial tracks on the opposed sides of the body portion will in cooperation with the arcuate ends of the guide member serve to form an endless track for a plurality of opposed ball bearings received therewithin. A cover plate is slid over the assembly to prevent the ball bearings from falling out of the endless track. With this recirculating ball bearing assembly, it is desirable that the partial opposed bearing tracks on the base plate and the partial opposed bearing tracks on the body portion align with one another to relatively close tolerances in order to provide a smooth uninterrupted surface for allowing the ball bearings to circulate freely. Accordingly, the body and base portions and the openings extending therethrough for securing the portions together must be manufactured to relative close tolerances.

U.S. Pat. No. 3,655,247 discloses a recirculating bearing having a cylindrical inner race body secured to a body portion by side plates. The body portion has a straight portion and arcuate end portions integrally joined thereto to provide a major portion of an outer race. The cylindrical race body is floatingly mounted on roller members interposed between the inner and outer races. The roller members have an annular radial concave recess centrally thereof to provide adjustability of the race body about its axial centerline.

U.S. Pat. Nos. 1,750,140 and 1,883,103 disclose antifriction ball bearing assemblies having ball bearing retainer strips or shields. Each retainer strip has a straight portion and arcuate end portions forming a major portion of an outer retainer for the ball bearings.

SUMMARY OF THE INVENTION

In accordance with a preferred embodiment of the invention, an improved recirculating ball bearing assembly is disclosed that is of simple design and construction, and economical to manufacture. The bearing assembly comprises a body portion having a recess on at least one side, the periphery of which forms a major portion of an outer race. The body portion further has an opening extending therethrough for receiving an inner race member, at least one side portion of which extends into a recess with the outer periphery thereof forming an endless inner race. The ball bearings are interposed between each inner race and its complementary major portion of the outer race. The ball bearings further surround the inner race to form an endless row of ball bearings.

One of the advantages of the recirculating ball bearing assembly of this invention is that it is of simple design and construction, and economical to manufacture. The number of parts involved in the construction of this bearing assembly are minimal. Another advantage of the recirculating bearing assembly of this invention is that the major portion of the outer race has a smooth uninterrupted peripheral surface comprising a straight portion and integral arcuate end portions, all formed by a unitary body portion. In prior bearing assemblies where the outer race is formed of two or more parts, a problem exists in adequately aligning the major portion of the peripheral surface of the outer race along its entire length to eliminate any interference to free movement of the ball bearings. This problem is eliminated in a bearing assembly of this invention by forming the outer race in a unitary member so that the major portion of the peripheral surface of the outer race along its entire length is smooth and uninterrupted.

The invention and its advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which:

FIG. 1 is a perspective view partially broken away showing, in partial schematic fashion, the bearing assembly in place;

FIG. 2 is a section view taken substantially along line 2—2 of FIG. 1;

FIG. 3 is a section view taken substantially along line 3—3 of FIG. 2; and

FIG. 4 is an exploded view showing the various components of the assembly in their relative position with regard to each other.

DETAILED DESCRIPTION OF THE INVENTION

With reference to FIG. 1 of the drawing, one possible application for the recirculating ball bearing assembly 10 of this invention is disclosed in which the bearing assembly is mounted by any suitable means between two objects 12, 14 for facilitating relative movement between the objects. The objects, for example, could be a grinder or milling machine and a cooperating way. In another possible application, not shown, the bearing assemblies could be incorporated in gibs or plates secured to a housing and arranged to form an opening extending therethrough for slidably supporting a shaft or ram.

With reference to FIGS. 2-4, a preferred embodiment of the recirculating ball bearing assembly 10 of this invention is disclosed comprising a body portion 16 having recesses 18 in opposite sides thereof terminating in base surfaces 19. The periphery of each of the recesses 18 forms a major portion of an outer race comprising a straight peripheral surface portion 20 and integral arcuate peripheral end surface portions 22, both of which are smooth and uninterrupted along their entire length. The body portion 16 further has an elongated opening 24 (FIG. 4) extended therethrough parallel to a bottom surface 26 and spaced therefrom to define a body plate 25. An elongated inner race plate 28 having arcuate ends 30 is insertable through opening 24 with side portions 32 thereof extending into recesses 18 as best seen in FIG. 2. The body portion 16 and inner race plate 28 are secured together by two or more screws 34 as best illustrated in FIGS. 2 and 4. The screws 34 extend through openings 35, 37 respectively in body portion 16 and inner race plate 28 and thread into complementary openings in body plate 25. Openings 37 can be enlarged or elongated to allow some adjustability of plate 28 relative to body portion 16, if desired.

The outer periphery 33 of each of the side portions 32 of inner race plate 28 forms an endless inner race for an endless row of ball bearings 36. Since the peripheral surface 33 of each inner race and complementary major portion of the outer race (surfaces 20 and 22) are smooth, uninterrupted continuous surfaces, each row of ball bearings 36 are free to circulate without binding or catching. Each endless row of ball bearing 36, as best seen in FIG. 3, is retained around its complementary inner race plate 28 by a U-shaped cover plate (FIGS. 2 and 4) having a base 40, depending legs 42 coacting with the base surfaces 19 of recesses 18 for laterally confining ball bearings 36 and turned in ribs 44 at the ends thereof for preventing a lower reach 45 of ball bearings 36 from falling out of the bearing assembly 10. Each lower reach 45 of ball bearings 36 extends past flat bottom surface 26 for slidably engaging a flat surface 46 of lower object 14. The flat surface 46 of object 14, in effect, forms a minor portion of the outer race for the lower reach of ball bearings 36.

The invention has been described in detail with particular reference to a preferred embodiment, but it will be understood that variations and modifications can be effected within the spirit and scope of the invention as described.

What is claimed is:

1. A recirculating ball bearing assembly for facilitating sliding movement between a pair of objects comprising:
    a unitary body having a bottom surface, and an outer side surface substantially perpendicular to said bottom surface;
    said body further having a base surface parallel to and spaced from said side surface and extending from said bottom surface, said body further having a smooth continuous outer surface having a substantially straight portion and arcuate end portions, each arcuate end portion having one end integral with one end of said straight portion and its other end lying in said bottom surface, said outer surface arranged perpendicular to and connecting said base surface to said side surface to define a major portion of an outer race, said base surface and said outer surface further cooperating to define a substantially oblong-shaped recess;
    a first opening parallel to and spaced from said bottom surface and extending from said base surface through said body to define a body plate;
    an inner race plate having a substantially oblong longitudinal cross section insertable through said first opening with an oblong-shaped side portion of said plate extending into said recess wherein the periphery of said side portion forms an endless inner race in register with and spaced from said outer race, said inner race plate further having an enlarged second opening extending therethrough;
    means extending through said second opening and engageable with said body plate for adjustably securing said inner race plate to said body;
    an endless row of ball bearings mounted in said recess around said endless inner race with a plurality of said ball bearings interposed between said inner race and said major portion of said outer race and the remainder of said ball bearings extending from said inner race beyond said bottom surface; and
    a cover plate on said side surface of said body for retaining said endless row of ball bearings in said recess.

2. A recirculating ball bearing assembly for facilitating sliding movement between first and second objects comprising:
    a unitary body connected to said first object and having a substantially flat bottom surface and opposed, parallel, spaced, outer side surfaces perpendicular to said bottom surface;
    each of said side surfaces of said body having a base surface parallel to and spaced from said side surface and extending from said bottom surface, each of said side surfaces of said body further having a smooth continuous outer surface having a substantially straight portion and arcuate end portions, each arcuate end portion having one end integral with one end of said straight portion and its other end lying in said bottom surface, each of said outer surfaces arranged perpendicular to and connecting said base surface to said side surface to define a major portion of an outer race, each of said base surfaces and said outer surfaces further cooperating to define a substantially oblong-shaped recess;
    said body further defining a first opening of oblong-shaped cross section extending from one of said base surfaces to said other of said base surfaces through said body parallel to and spaced from said bottom surface to define a body plate with the ends of said first opening terminating at said base surfaces, the periphery of each end of said first opening being substantially equidistantly spaced from said complementary outer race;
    an inner race plate insertable through said first opening with oblong-shaped side portions thereof extending from each of said base surfaces into each of said recesses to form an endless inner race in each of said recesses spaced from and in register with said complementary outer race, each inner race having upper and lower flat surfaces joined by arcuate end surfaces, each of said lower flat surfaces further cooperating with an opposing, spaced flat surface on said second object which forms a minor part of said outer race, said inner race plate further having an enlarged second opening extending therethrough;
    means extending through said second opening and engageable with said body plate for adjustably securing said inner race plate to said body;
    ball bearings mounted in the space between each of said endless inner races and each of said major and minor parts of said outer races; and
    a cover plate on each of said side surfaces of said body for retaining said ball bearings in each of said recesses.

* * * * *